Nov. 3, 1942.    M. OLLEY    2,300,844
SPRING SUSPENSION
Filed Dec. 23, 1939    3 Sheets-Sheet 1

Inventor
Maurice Olley
Attorneys

Nov. 3, 1942.　　　　M. OLLEY　　　　2,300,844
SPRING SUSPENSION
Filed Dec. 23, 1939　　　3 Sheets-Sheet 3

Inventor
Maurice Olley
By
Blackmore, Spencer & Flint
Attorneys

Patented Nov. 3, 1942

2,300,844

UNITED STATES PATENT OFFICE 2,300,844

SPRING SUSPENSION

Maurice Olley, Detroit, Mich., assignor to General Motors Corporation, Detroit, Mich., a corporation of Delaware Application December 23, 1939, Serial No. 310,731
In Great Britain June 13, 1939

18 Claims. (Cl. 180—73)

This invention relates to a vehicle suspension system, and particularly to a suspension system for a motor vehicle having a rigid axle carrying road wheels on opposite sides of the vehicle, and coil spring suspension means between the axle and the vehicle frame.

The object of the invention is an arrangement of links for controlling movement of the axle relatively to the vehicle frame, having the advantage of low cost and weight, and which is applicable to vehicles with low seats and floors.

Another object of the invention is a rear axle suspension system, such that, upon unequal deflection of its two wheels relatively to the vehicle frame, the rear axle will rock about a rocking axis which is inclined downwardly and forwardly.

A still further object of the invention is a suspension system for a rear driving axle with universally jointed propeller shaft, such that the virtual torque arm center of the linkage, about which the axle turns, as it moves up and down, is in a plane normal to the propeller shaft approximately at its mid-point.

The above and other objects of the invention will be apparent as the description proceeds.

According to the invention, the rigid axle is guided, in its movements relatively to the frame, by two pairs of links lying respectively in an upper and a lower of two superposed planes which are normal to the vertical longitudinal mid-plane of the vehicle, the links having their opposite ends respectively pivotally connected to the axle and the vehicle frame. The links of each pair are of course disposed symmetrically on opposite sides of the vertical longitudinal mid-plane of the vehicle. The projected length of the upper links longitudinally of the vehicle is preferably shorter than the projected length of the lower links longitudinally of the vehicle.

In the preferred construction the two superposed planes are convergent from the axle towards the opposite end of the vehicle, and both pairs of links extend from the axle towards the opposite end of the vehicle, the upper links being convergent from their pivotal connections on the vehicle frame to their pivotal connections on the axle housing, and the lower links being convergent from their pivotal connections on the axle housing to their pivotal connections on the vehicle frame.

The drawings show two different arrangements according to the invention, and as applied to the rear axle of a motor vehicle.

Figure 1:
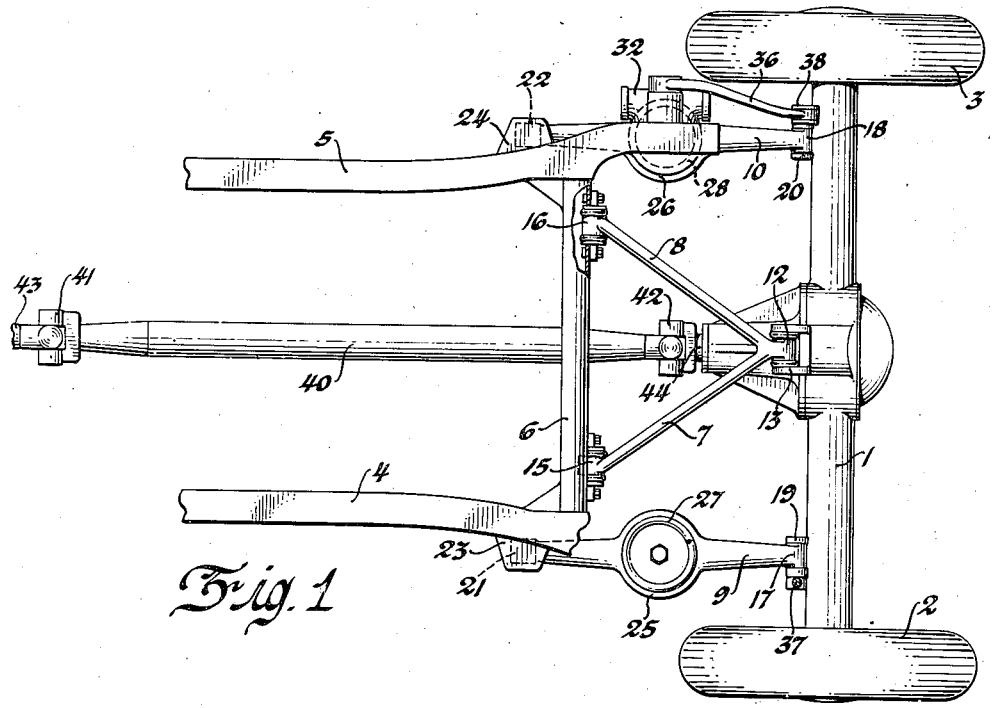
Fig. 1 is a plan view of the rear end of a motor vehicle chassis with parts broken away to show one example of a structure according to the invention.
Figure 2:
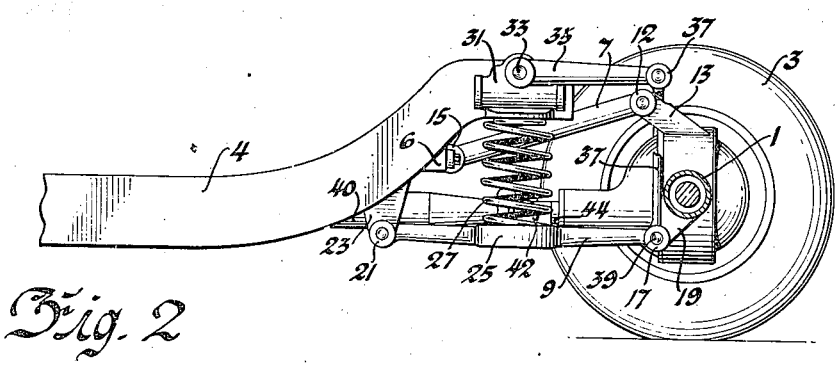
Fig. 2 is a view in elevation, of the structure shown in Fig. 1, with one wheel removed.

In Figs. 1 and 2, the rear axle housing 1, with its wheels 2 and 3, is guided in its movements relatively to the vehicle frame, which includes side members 4 and 5 and a cross member 6, by a pair of upper links 7 and 8 and a pair of lower links 9 and 10.

The upper links 7 and 8 are convergent towards the rear axle, at which end they are connected together to form a V shaped link, or wishbone, the apex of which has a pivotal connection 12, to a bracket 13, secured to the rear axle housing 1 above its middle. The spaced apart ends of the upper links 7 and 8 have pivotal connections 15 and 16 respectively, to the cross member 6.

The lower links 9 and 10 have pivotal connections 17 and 18 to brackets 19 and 20 respectively secured to the underside of the axle housing 1, towards the opposite ends thereof. The other ends of the links 9 and 10 have pivotal connections 21 and 22 to brackets 23 and 24 on the frame side members 4 and 5 respectively. As seen in Fig. 1, lower links are parallel in plan view.

The two pairs of links 7, 8 and 9, 10, respectively lie in an upper and a lower of two superposed planes which are normal to the vertical longitudinal mid-plane of the vehicle, said planes converging from the axle towards the opposite end of the vehicle as shown in Fig. 2.

The lower links 9 and 10 are provided with spring seats 25 and 26 for coil springs 27 and 28 between the said links and the side members 4 and 5 of the vehicle frame.

Shock absorbers 31 and 32 are mounted on the frame side members 4 and 5 respectively. Secured to the operating spindles such as 33 of the shock absorbers are lever arms 35 and 36, which extend rearwardly towards the axle and are provided with link connections 37 and 38 to the pivot pins such as 39 of the pivotal connections 17 and 18 of the links 9 and 10.

The wheels 2 and 3, are driven through a propeller shaft 40 of which the opposite ends have universal joint connections 41 and 42 respectively to a shaft 43 driven by the engine (not shown) and a drive shaft 44 for the rear axle.

Figure 3:
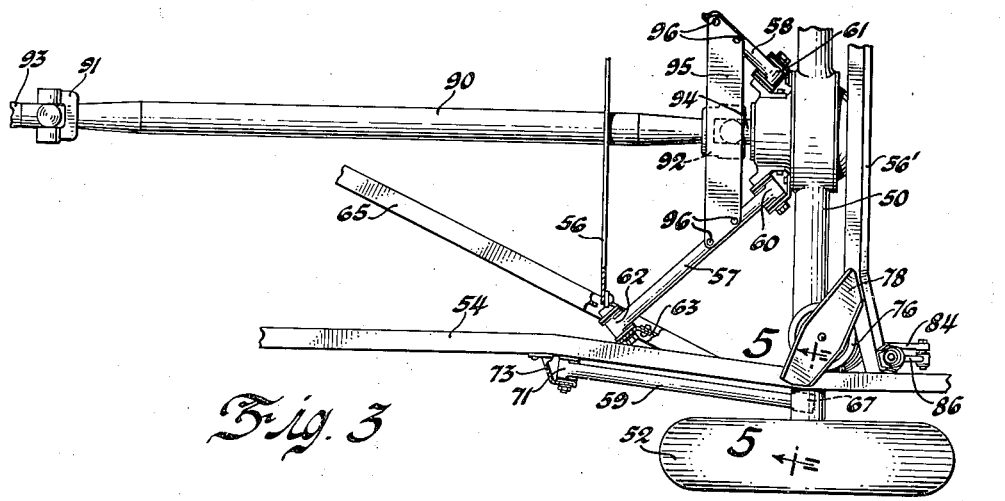
Fig. 3 is a part plan view of the rear end of a motor vehicle chassis showing a preferred arrangement according to the invention.
Figure 4:
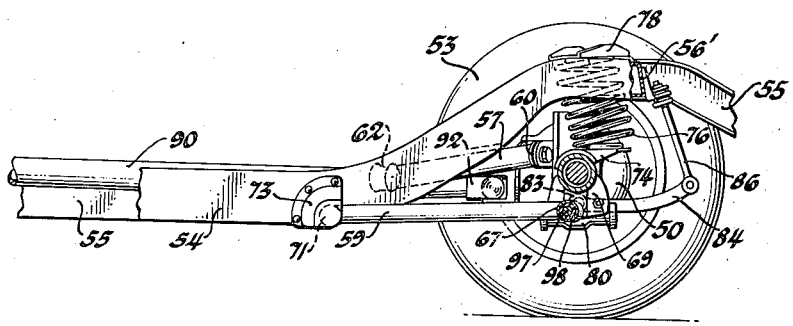
Fig. 4 is a view in elevation of the structure shown in Fig. 3 with one wheel removed.

In Figs. 3 and 4, the rear axle housing 50 with its wheels 52 and 53 is guided in its movements relatively to the vehicle frame, which includes side members 54 and 55 and cross members 56 and 56', by a pair of upper links 57 and 58 and a pair of lower links such as 59.

The upper links 57 and 58, are convergent rearwardly towards the rear axle where they have pivotal connections 60 and 61 respectively, to the rear axle housing 50 above its center line. The other ends of the links 57 and 58 each have pivotal connections such as 62 to brackets such as 63 on X members such as 65 of the vehicle frame.

The lower links such as 59, have pivotal connections such as 67 to brackets such as 69 secured to the underside of the axle housing 50, towards the opposite ends thereof. The other ends of the links such as 59 have pivotal connections such as 71 to brackets such as 73, on the frame side members 54 and 55. As seen in Fig. 3 the lower links are slightly convergent from their pivotal connections on the axle forwardly to their pivotal connections on the vehicle frame.

The upper links 57, 58, and the lower links such as 59 lie respectively in an upper and a lower of two superposed planes which are normal to the vertical longitudinal mid-plane of the vehicle, said planes converging from the axle towards the opposite end of the vehicle as shown in Fig. 4.

Suitable perches such as 74 are provided towards the opposite ends of the axle 50, for coil springs such as 76 between the said perches and parts of the frame constituted by corner strengthening pieces such as 78 between the cross member 56' and the side members 54 and 55 respectively of the frame.

Shock absorbers such as 80 are mounted on suitable brackets secured to the underside of the axle 50. Secured to the operating spindles such as 83 of the shock absorbers, are lever arms such as 84, which extend rearwardly from the axle and are provided with vertical link connections such as 86 to the frame cross member 56'.

The wheels 52 and 53 are driven through a propeller shaft 90 of which the opposite ends have universal joint connections 91 and 92 respectively to a shaft 93 driven by the engine (not shown) and a drive shaft 94 for the rear axle.

The links 57 and 58 are connected together by a flat stabilizer bar 95 which is secured thereto by bolts such as 96. Roll of the vehicle, due to the effect of centrifugal force in cornering, is resisted to the extent that independent pivotal movement of the links 57 and 58 is prevented; the stabilizer bar 95 which is subjected to bending and twisting stresses tends to prevent such independent pivotal movements of the links 57 and 58.

Figure 5:
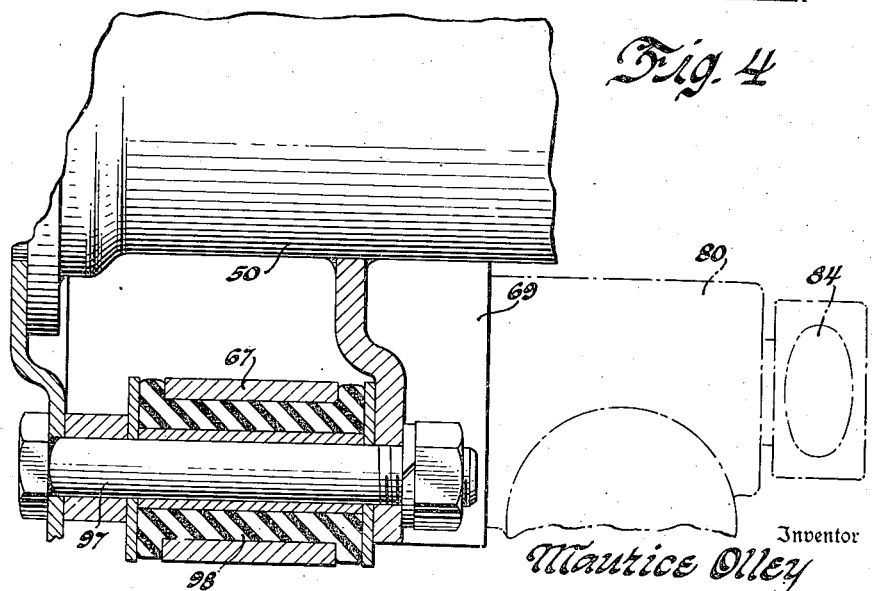
Fig. 5 is an enlarged part sectional view of a detail on line 5—5 of Fig. 3.

The pivotal connections such as 12, 15, 16, 17, 18, 21 and 22 of Figs. 1 and 2, and 60, 61, 62, 67 and 71 of Figs. 3 and 4, are of the general form shown in Fig. 5, which is an enlarged part sectional view of the pivotal connection 61. They include a stationary pivot pin such as 97, suitably secured to the frame or axle, with a resilient bushing 98 of rubber or the like, in compression between the pivot pin and the link which is pivoted thereon, to allow a desirable degree of universal movement. Such pivotal connections are of well known form and need not further be described.

The resilient bushings in the pivotal connections of the linkage, prevent any serious transfer of oscillations between the various degrees of freedom of the axle and enable them to be kept out of tune with the natural frequency of vibration of various elements of the vehicle body; they also effect noise insulation; for these reasons they are desirable, if not actually necessary, at least at one end of each link, although bushings such as cotton liners impregnated with lubricant but having a small amount of friction, might with advantage, in some circumstances, be substituted for the resilient bushings at the other end of each link.

Upon unequal deflection of the two wheels at opposite ends of the axle relatively to the vehicle frame, the axle rocks about a "rocking axis" which lies in the vertical longitudinal mid-plane of the vehicle, and passes through the intersection points of the links produced, in their respective planes.

As the axle moves up and down, it also turns about a virtual radius arm center or torque arm center, which is in the line of intersection of the planes of the upper and lower pairs of links.

It is desirable that the rocking axis of the rear axle shown in Figs. 1 to 4, should be inclined downwards towards the front of the vehicle, so that when the vehicle rolls on turning a corner the rear axle (as seen in plan view) will turn slightly away from a position in which the rear wheels are parallel to the vertical longitudinal mid-plane of the vehicle, in a direction to oppose the turn and thereby make the handling of the vehicle more stable. The intersection point of the upper links produced should be higher than the intersection point of the lower links produced, to achieve this. The higher the rocking axis passes above the axle center, the greater the reduction of tramping motions of the rear axle and transverse shaking of the car resulting therefrom, and the higher the roll axis at the rear of the vehicle. The roll axis of the vehicle passes through the point of intersection of the rocking axis with a vertical line through the center of the rear axle. A higher roll axis at the rear improves the ride of the vehicle, permits the combination of a low rolling frequency with a high roll stability and improves the stability of handling.

It is also desirable that the torque arm center be as nearly as possible in a plane perpendicular to the propeller shaft at its mid-point, in order that the universal joint angles at opposite ends of the propeller shaft may be equal in all positions of the axle, for a constant angular velocity drive.

Figures 6, 7, 8, 9:
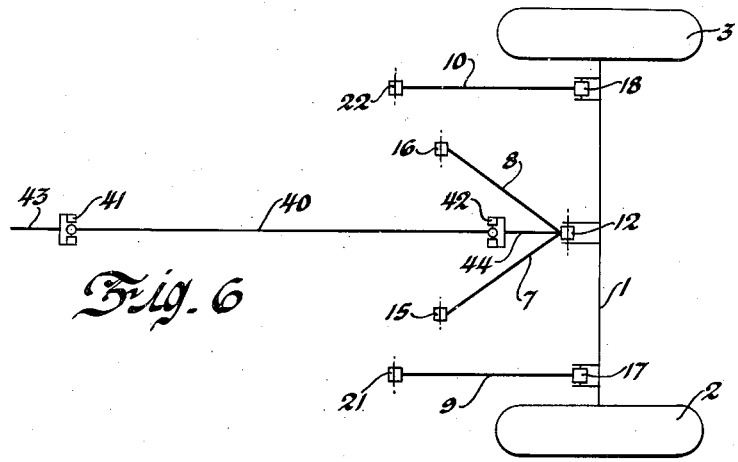
Figs. 6 and 7 are diagrammatic representations of the suspension system shown in Figs. 1 and 2 respectively.
Figs. 8 and 9 are diagrammatic representations of the suspension system shown in Figs. 3 and 4 respectively.

In Figs. 1 and 2, and as shown diagrammatically in Figs. 6 and 7, the lower links 9 and 10 are parallel. In this circumstance the rocking axis ab, which passes through the point of intersection of the upper links 7 and 8 at 12, is parallel to the plane of the lower links which are approximately horizontal.

The torque arm center $m$, is in the line of intersection of the planes of the upper and lower pairs of links and approximately in a plane $gh$, perpendicular to the propeller shaft at its mid-point, as shown in Fig. 7.

In Figs. 3 and 4, and as shown diagrammatically in Figs. 8 and 9, the lower links such as 59 are forwardly convergent; the rocking axis $cd$ is not parallel to the plane of the lower links such as 59 but passes through the intersection point $e$ of the upper links and the intersection point $f$ of the lower links and is downwardly and forwardly inclined to a greater extent than the plane of the lower links.

The torque arm center $n$ is in the line of intersection of the planes of the upper and lower pairs of links as shown in Fig. 9, and somewhat ahead of the plane $kl$, perpendicular to the propeller shaft at its mid-point, while being approximately therein as shown in Fig. 9.

It will be seen that while a structure with parallel lower links such as those shown in Figs. 6 and 7 could be arranged to have an inclined rocking axis if the plane of the lower links were inclined, the arrangement of Figs. 8 and 9, with lower links which are convergent in their plane, can provide an inclined rocking axis even if the plane of the lower links is horizontal, or in other words that the desired inclination of the rocking axis can be obtained independently of the inclination of the plane of the lower links by making the lower links convergent in their plane. In the example illustrated in Figs. 3 and 4, and 8 and 9, the desired amount of roll under steer can be obtained without having to lower the front end of the lower arms and reduce ground clearance.

It will be appreciated, that a structure according to the invention is applicable to vehicle frames without X members and to uniframe car designs, and provides greatly improved control of six different degrees of freedom of the axle which are as follows: torsional "wind up" about the longitudinal axis of the axle—due principally to driving and braking forces; "yawing" about a vertical axis through the middle of the axle; "tramp" about a horizontal longitudinal axis; shake laterally or along the axis of the rear axle; shake fore and aft in a horizontal plane containing the axis of the rear axle; or wheel hop and oscillations of the axle in a vertical plane containing the axis of the rear axle.

I claim:

1. In a motor vehicle, in combination, a frame, a rigid axle carrying road wheels on opposite sides of the vehicle, and means to control movement of the axle relatively to the vehicle frame, including two pairs of links having their opposite ends respectively pivotally connected to the axle and the vehicle frame, said pairs of links lying respectively in an upper and a lower of two superposed planes which are normal to the vertical longitudinal mid-plane of the vehicle and convergent longitudinally of the vehicle, the links of each pair being disposed symmetrically on opposite sides of the said longitudinal mid-plane, the links of at least one of the pairs being convergent in their said plane, and the pivoted ends of the upper and lower links being spaced from each other in elevation.

2. The combination according to claim 1, in which the planes of the upper and lower pairs of links are convergent from the points of connection of the links to the axle, to the points of connection of the links to the vehicle frame.

3. The combination according to claim 1, in which the upper links are convergent in their plane.

4. The combination according to claim 1, in which the upper links are convergent, and the lower links are parallel, in their respective planes.

5. The combination according to claim 1, in which the upper links and the lower links are convergent in their respective planes.

6. The combination according to claim 1, in which the links of the upper pair and the links of the lower pair respectively converge in generally opposite directions longitudinally of the vehicle.

7. The combination according to claim 1, in which the upper links are convergent from their pivotal connections on the vehicle frame to their pivotal connections on the axle.

8. The combination according to claim 1, in which the upper links are convergent from their pivotal connections on the vehicle frame to their pivotal connections on the axle, and the lower links are parallel in their plane.

9. The combination according to claim 1, in which the upper links are convergent from their pivotal connections on the vehicle frame to their pivotal connections on the axle, and the lower links are convergent from their pivotal connections on the axle to their pivotal connections on the vehicle frame.

10. The combination according to claim 1, in which the projected length of the upper links longitudinally of the vehicle, is shorter than the projected length of the lower links longitudinally of the vehicle.

11. The combination according to claim 1, in which the axle is a rear driving axle housing, the upper links are convergent and the lower links are parallel in their respective planes, and the rocking axis of the axle housing, which lies in the vertical longitudinal mid-plane of the vehicle, passes through the intersection point of the upper links produced, and is parallel to the plane of the lower links, is approximately horizontal.

12. The combination according to claim 1, in which the axle is a rear driving axle housing, the upper links and the lower links are convergent in their respective planes, and the rocking axis of the axle housing, which lies in the vertical longitudinal mid-plane of the vehicle, and passes through the intersection points of the pairs of upper and lower links produced in their respective planes, is inclined downwardly and forwardly of the vehicle.

13. In a motor vehicle, in combination, a frame, an engine driven shaft, a rear driving axle housing carrying road wheels on opposite sides of the vehicle, a drive shaft for the axle, shaft means including a propeller shaft for transmitting drive from the engine driven shaft to the drive shaft for the axle, a universal joint at each end of the propeller shaft, and means to control movement of the axle housing relatively to the vehicle frame, including two pairs of links having their opposite ends respectively pivotally connected to the axle housing and the vehicle frame, said pairs of links lying respectively in an upper and a lower of two superposed planes which are normal to the vertical longitudinal mid-plane of the vehicle and intersect in a plane perpendicular to the propeller shaft approximately at its mid-point, the links of each pair being disposed symmetrically on opposite sides of the said longitudinal mid-plane.

14. The combination according to claim 13, in which the upper links are convergent rearwardly from their pivotal connections on the vehicle frame to their pivotal connections on the axle, and the lower links are parallel in their plane.

15. The combination according to claim 13, in which the upper links are convergent rearwardly from their pivotal connections on the vehicle frame to their pivotal connections on the axle, and the lower links are convergent forwardly from their pivotal connections on the axle housing to their pivotal connections on the vehicle frame.

16. The combination according to claim 13, in which the pivotal connections of the upper links to the rear axle and the pivotal connections of the lower links to the rear axle, are respectively above and below the center line of the rear axle.

17. The combination according to claim 1, in which resilient bushings are included in the pivotal connection at one end of each link.

18. The combination according to claim 1, in which resilient bushings are included in the pivotal connections at each end of each link.

MAURICE OLLEY.